July 11, 1967    R. H. FOX    3,330,020
TOOL HOLDER

Filed Dec. 1, 1964    3 Sheets-Sheet 1

INVENTOR
ROBERT H. FOX

BY Brown & Seward
His Attorneys

July 11, 1967   R. H. FOX   3,330,020
TOOL HOLDER
Filed Dec. 1, 1964   3 Sheets-Sheet 2

INVENTOR
ROBERT H. FOX
BY Brown & Seward
His Attorneys

July 11, 1967    R. H. FOX    3,330,020
TOOL HOLDER

Filed Dec. 1, 1964    3 Sheets-Sheet 3

INVENTOR
ROBERT H. FOX

BY *Brown + Seward*
HIS ATTORNEYS

United States Patent Office 3,330,020
Patented July 11, 1967

3,330,020
TOOL HOLDER
Robert H. Fox, Woodbury, Conn.
(279 Humiston Circle, Thomaston, Conn. 06787)
Filed Dec. 1, 1964, Ser. No. 415,026
6 Claims. (Cl. 29—98)

The object of my invention is to provide a tool holder of relatively simple construction in which means permit movement of the tool in a path substantially parallel with the pusher and return the tool to its initial position without the use of levers, dovetail slides, gears, compression springs, radial swinging arms, or sliding levers as are used in present structures.

Another object is to provide a structure of the character described in which initial adjustment of the tool is accomplished by bodily moving an entire tool holding unit.

Another object is to provide a front face or part so designed as to accommodate a part of the work piece therein, whereby space is saved between the turret part and the lathe part.

Another object is to provide a mechanism of the character described in which the tool holder can be activated from the front or rear slide by a simple relocation of parts.

Another object is to provide a tool holder which may be quickly and easily adjusted, including regulated movement of the part carrying the tool.

Present recess tool holders, because of their limited size and construction, have very little mechanical movement which therefore limits range of actual cutting capacity.

Many holders, complex in structure and adjustment, have caused unnecessary machine shut-down time.

My tool holder has no mechanical moving parts such as gears, dovetail slides, sliding members or levers like present swing tool holders. Therefore, my design has no place chips or metal cuttings can collect, thereby causing malfunction and machine shut-down time.

This invention is mounted in the turret of a single or multi-spindle automatic machine. The structure permits its use also on lathes, turret lathes, drilling machines, jig borers and any other machine used to form rod (hex, square or round, etc.) to any shape or size.

A practical embodiment of my invention is illustrated in the accompanying drawings in which.

Figure 1:
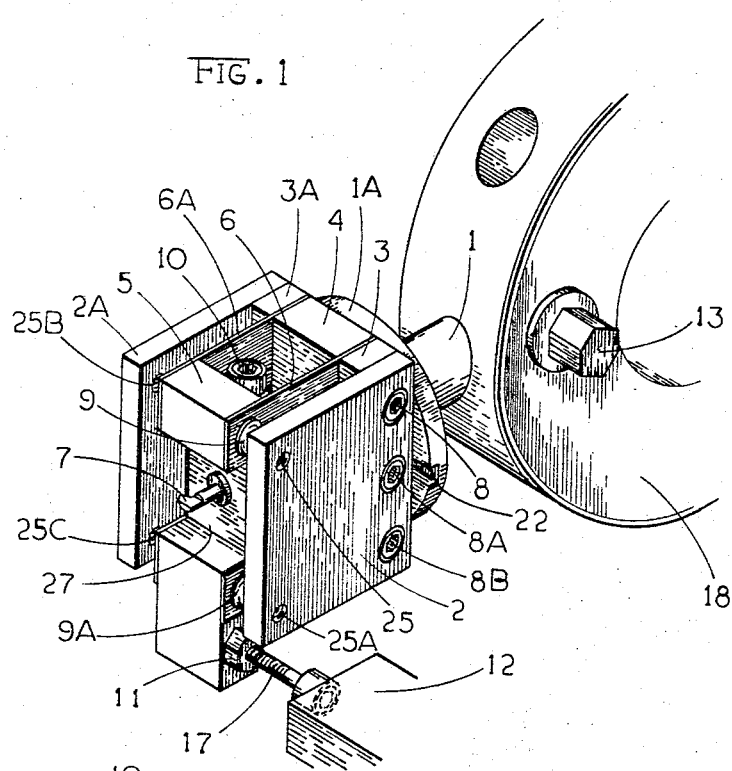
FIG. 1 is a perspective view showing a tool holder constructed according to my invention and mounted in the turret of an automatic screw machine.

Referring to the several views of the drawings, the shank 1 is mounted in turret 18 of an automatic screw machine and secured in its proper horizontal position as by a hex head machine screw 13. Recess tool 7 is located as shown in FIG. 1 and secured with cap screw 10 in the front mounting plate 5.

Figure 4:
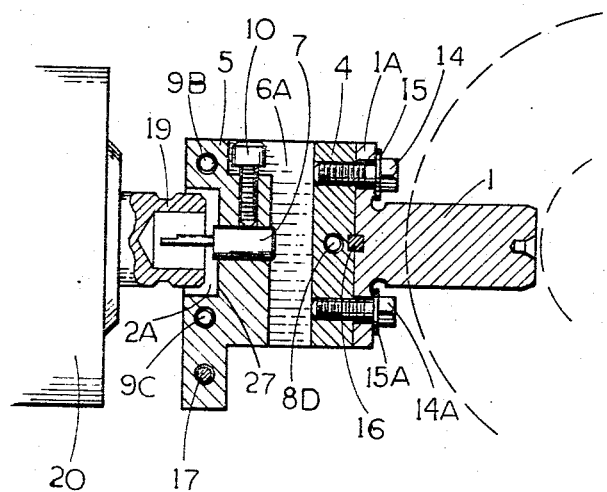
FIG. 4 represents a vertical section taken on line IV—IV of FIG. 3, looking in the direction of the arrows, the tool being mounted for a recessing operation.

Shank 1 is keyed by key 16 to backing plate 1A in keyway 22 in said plate 1A which is adjustably mounted on and held to shank 1 by screws 14, 14A, through washers 15, 15A, said screws being received in rear mounting plate 4 (see FIG. 4). Plate 1A is provided with elongated slots 23, 24 through which screws 14, 14A project into plate 4.

Figure 7:
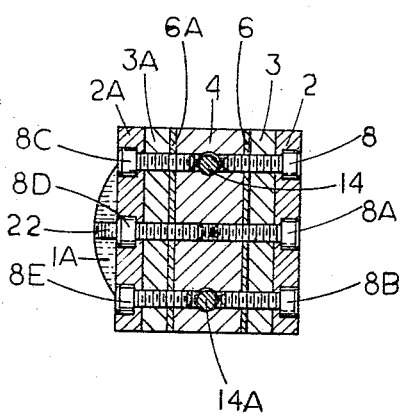
FIG. 7 represents a section taken on the line VII—VII of FIG. 5 looking in the direction of the arrows.

Flat spring plates 6 and 6A are mounted adjacent plate 4 and are spaced from side plates 2 and 2A by spacers 3 and 3A. The said spring plates 6, 6A are secured to the said side plates and spacers by means of the screws 8, 8A, 8B, 8C, 8D and 8E (see FIG. 7).

Front plate 5 is secured between spring plates 6 and 6A with screws 9, 9A, 9B, 9C in a plane parallel to rear mounting plate 4.

Side plates 2, 2A are provided with screw holes 25, 25A, 25B and 25C to accommodate screws 28, 28A, 28B, 28C for purposes to be more fully set forth below.

Figure 2:
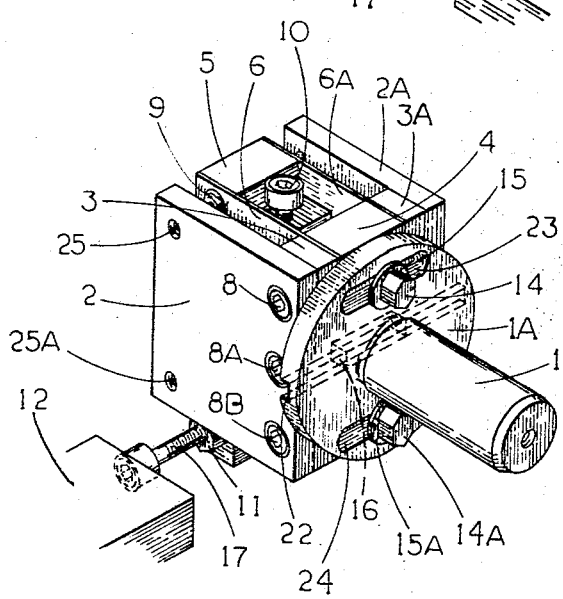
FIG. 2 represents, in perspective, a rear view of the embodiment shown in FIG. 1, the turret having been omitted in this view for clarity of illustration.
Figure 3:
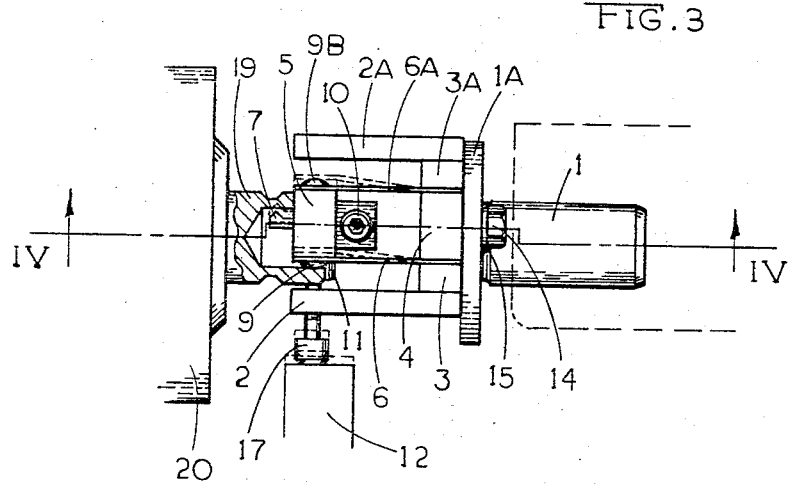
FIG. 3 is a top plan view of the embodiment shown in FIGS. 1 and 2, partly in section and partly broken away, showing the tool as applied to a work piece in an automatic screw machine.

A pusher 12 of a well known type is shown in FIGS. 1, 2 and 3 for operation against the screw 17 which is mounted in the lower portion of front mounting plate 5 and is adjustably held by hex nut 11 for longitudinal adjustment with respect to plate 5.

As shown in FIGS. 3 and 4, a work piece 19, about to be recessed, is held by spindle 20.

Figure 5:
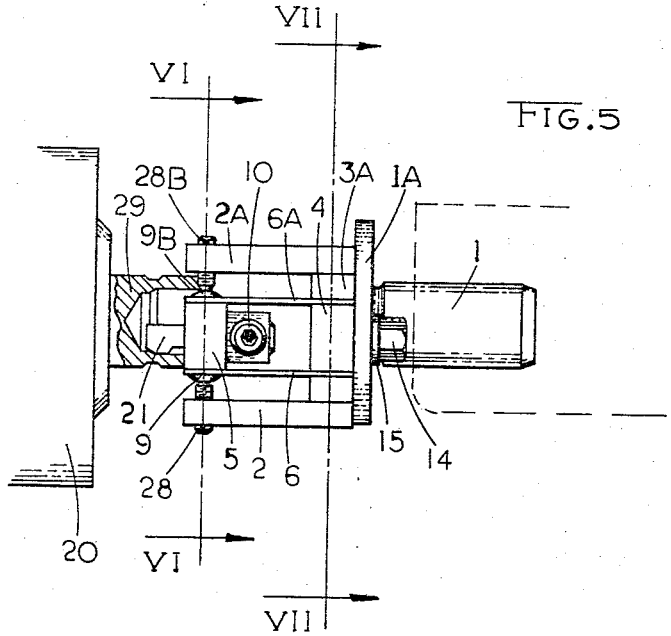
FIG. 5 represents a top plan view, partly in section and partly broken away, of a unit constructed according to my invention, set up for boring or turning.

In FIG. 5 the work piece 29 is set for boring by the tool 21.

Set screws 28, 28A are mounted in side plate 2 and abut screws 9, 9A for positioning plate 5 and set screws 28B, 28C are mounted in side plate 2A to abut screws 9B, 9C and oppose screws 28, 28A.

OPERATION

When my tool holder is used for swing recessing as shown in FIGS. 1, 2 and 3, front mounting plate 5 is set to the initial correct lateral adjustment by loosening screws 14, 14A, permitting their movement in the elongated slots 23 and 24. When the plate 5 has reached the desired adjusted position the screws 14, 14A are then tightened to so hold it. Pusher 12 is then activated against cap screw 17 to move the front mounting plate 5 which carries tool 7 laterally because it is supported between the flat plate springs 6 and 6A. When the pusher 12 retracts, the said springs 6 and 6A return the front mounting plate 5 to its starting position. This simple action or movement is novel in structures of this type in that the recessed tool 7 is moved in a path substantially parallel with the direction of the pusher 12.

It will be understood that this tool works equally well for left or right hand cutting simply by replacing the tool part 7 with a properly sharpened tool and by changing the elements 11 and 17 from one side of front plate 5 to the other side thereof.

Standard recess tool holders use dovetail slides, gears, compression springs, or radial swinging arms to impart this simple action. This type of structure is much more complicated to set up and chips or small parts become lodged in their workings, thus causing breakage.

BORING

When the tool holder is used for boring as shown in FIG. 5 the unit carrying the tool 21 is initially adjusted to the correct lateral adjustment by operating the screws 14, 14A as outlined above. Four set screws 28, 28A, 28B and 28C are placed in the slide plates 2 and 2A and are tightened against screws 9, 9A, 9B, 9C in the front mounting plate 5 equally from each side. If the boring tool 21 cuts too small a hole in the work piece 29, the said set screws located in side plate 2 are loosened and the set screws located in side plate 2A are tightened, thereby causing the front mounting plate 5 carrying the tool 21 to move in the desired direction.

If, however, the said tool is boring too large a hole, the procedure outlined in the preceding paragraph is reversed. This boring method, although very simple, proves extremely fast and accurate.

Figure 6:
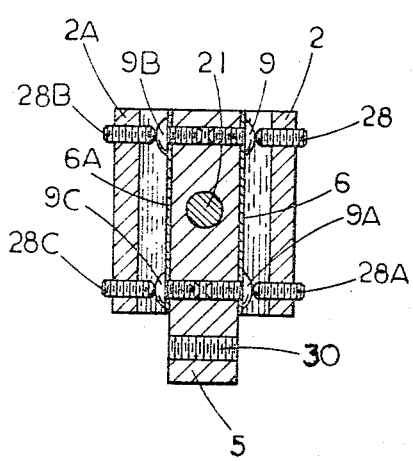
FIG. 6 represents a section taken on the line VI—VI of FIG. 5, looking in the direction of the arrows.

It will be noted that elements 11 and 17 are removed from tapped hole 30 (FIG. 6) for the boring set up.

The recessed or cutout portion 27 of the front face of the plate 5 (see FIGS. 2 and 4) enables the work piece 19 to protrude into this cutout, thereby saving valuable space between turret 18 and spindle 20.

Since it is evident that changes may be made in the form, construction and arrangement of the several parts without departing from the spirit and scope of my invention, I do not intend to be limited to the specific embodiments herein shown and described except as set forth in the appended claims.

What I claim is:

1. A tool holder comprising, a shank, its flange, keyway and slots in flange, back plate keyed to flange, screws through slots into back plate, side plates, flat spring plates, spacers between side plates and spring plates, means joining side plates, spacers, spring plates, back and front plates, front recess in said front plate, means for adjusting the front plate with respect to the side plates, cutting tool, means in front plate for securing tool therein, other means for activation of said holder and tool whereby activation of holder and tool in a right line by said last means enables cutting operation on work piece and retraction of said activating means automatically restores this tool to its original position.

2. A tool holder, its shank, a unit held to and adjustable with respect to said shank, a unit comprising a back plate, together with spring plates, spacers and side plates, a front plate, and a tool holder removably held to said front plate, and means for biasing said spring plates and tool laterally and returning same to the initial position when the biasing means is retracted.

3. A tool holder, its shank, a unit held to and adjustable with respect to said shank, a tool removably held in said unit, spring means comprising part of said unit and means for biasing said spring means and tool laterally and returning same to the initial position when the biasing means is retracted, and means for adjusting the unit with respect to the shank including a shank flange, slots therein, opposed keyways on the flange and unit, a key therein, and means for releaseably holding the unit to the flange.

4. A tool holder, its shank, a unit held to and adjustable with respect to said shank and including a back plate, a front plate, side plates on said unit, spring means removably mounted between said side plates in said back plate, a tool removably held between the side plates and means for biasing said spring means and tool laterally toward or away from each side plate and returning same to the initial position by actuation of said biasing means.

5. The combination according to claim 4 in which the element holding the tool is individually and laterally adjustable.

6. The combination according to claim 4 including a cut-out section of said front plate adjacent the tool holding section to accommodate a work piece, whereby the working area for the tool is increased by the extent of the cut-out section.

References Cited
UNITED STATES PATENTS

| 2,355,315 | 8/1944 | MacBlane | 29—98 X |
| 2,370,742 | 3/1945 | Mercer | 29—97.5 |
| 2,916,802 | 12/1959 | Blomstrand | 29—98 X |
| 2,988,843 | 6/1961 | Trible | 29—98 X |

HARRISON L. HINSON, *Primary Examiner.*